United States Patent [19]
Kourtakis et al.

[11] Patent Number: 4,996,189
[45] Date of Patent: Feb. 26, 1991

[54] METHOD OF PRODUCING MIXED METAL OXIDE MATERIAL, AND OF PRODUCING A BODY COMPRISING THE MATERIAL

[75] Inventors: Kostantinos Kourtakis, Summit; Murray Robbins, Berkeley Heights, both of N.J.

[73] Assignee: AT&T Bell Laboratories, Murray Hill, N.J.

[21] Appl. No.: 261,656

[22] Filed: Oct. 24, 1988

[51] Int. Cl.$^5$ .................. C01F 17/00; H01L 39/12
[52] U.S. Cl. ........................... 505/1; 420/901; 156/610; 252/521; 423/593; 423/594; 505/737
[58] Field of Search ............... 505/737, 1; 252/521; 423/593, 594; 156/610

[56] References Cited

U.S. PATENT DOCUMENTS

| | | | |
|---|---|---|---|
| 4,751,070 | 6/1988 | Verneker | 423/594 |
| 4,804,649 | 2/1989 | Sherif | 423/593 |
| 4,810,402 | 3/1989 | Mair | 423/594 |
| 4,839,339 | 6/1989 | Bunker et al. | 423/593 |
| 4,900,715 | 2/1990 | Cooper et al. | 505/1 |

FOREIGN PATENT DOCUMENTS 0309322 3/1988 France.

OTHER PUBLICATIONS

Iqbal et al., in High $T_c$ Superconducters (ed), Brodsky et al., MRS, vol. 99, Nov. 1987, p. 907.
Davison et al., Ibid, p. 289.
Cooper et al., Ibid., p. 165.
Liv et al., Ibid., p. 253.
European Search Report, The Hague, Jan. 31, 1990, by Examiner J. L. Harbron.
Nature, vol. 332, Mar. 31, 1988, "Crystal Structure of the High-Temperature Superconductor $Tl_2Ba_2CaCu_2O_8$" by M. A. Subramanian et al, pp. 420-422.
Nature, vol. 332, Mar. 31, 1988, "Growth of Superconducting Single Crystals in the Bi-Sr-Ca-Cu-O System from Alkali Chloride Fluxes" by L. F. Schneemeyer et al., pp. 422-424.
Superconductor Applications: SQUIDs and Machines, edited by Brian B. Schwartz and Simon Foner, Plenum Press, New York and London (title page).
Superconductor Materials Science Metallurgy, Fabrication, and Applications, edited by Simon Foner and Brian B. Schwartz, Plenum Press, New York and London (Title Page).
Z. Phys. B-Condensed Matter 64, Springer-Verlag 1986, "Possible High $T_c$ Superconductivity in the Ba-La-Cu-O System" by J. G. Bednorz et al., pp. 189-193.
Journal of the American Ceramic Society, 70[12], Dec. 1987, "Preparation of High-$T_c$ Superconducting Oxides by the Amorphous Citrate Process" by C. Chu et al., pp. C-375-C-377.

(List continued on next page.)

Primary Examiner—Upendra Roy
Attorney, Agent, or Firm—Eugen E. Pacher

[57] ABSTRACT

A novel method of producing mixed metal oxide powder (e.g., ferrite powder, or high temperature superconductor powder such as $YBa_2Cu_3O_x$ powder) is disclosed. The method comprises forming an intimate mixture of appropriate metal salts (e.g., nitrates and acetates), at least one of which is an oxidizing agent with respect to at least one of the others, and heating the mixture to a reaction temperature such that an exothermic redox reaction occurs. Appropriate choice of oxidizing and reducing agents permits control of heat of reaction and reaction temperature. The product of the reaction typically is a precursor of the desired mixed oxide, the precursor typically consisting essentially of the metal constituents of the mixed oxide and oxygen. Heat treatment in an $O_2$-containing atmosphere transforms the precursor into the desired mixed oxide powder. The thus produced powder can then be used in conventional fashion, e.g., to produce bodies therefrom by pressing and/or sintering.

9 Claims, 2 Drawing Sheets

*Solid State Communications*, vol. 64, No. 6, 1986, "The Oxalate Route to Superconducting $YBa_2Cu_3O_{7-x}$" by X. Z. Wang et al., pp. 881–883.

*Seissan Kenkyu* (Japan), vol. 39(11), 1987, "Preparation of Superconductivity Specimens in the Y–Ba–Cu–O System by Coprecipitation Method" by A. Koyanagi et al., p. 8.

*Japanese Journal of Applied Physics*, vol. 26, No. 4, Apr. 4, 1987, "Structure and Superconductivity in a New Type of Oxygen Deficient Perovskites $Y_1Ba_2Cu_3O_7$" by M. Hirabayashi et al., pp. L-454–455.

*Japanese Journal of Applied Physics*, vol. 26, No. 5, May 1987, "On the Coprecipitation Method for the Preparation of High T M–X–Cu–O(M=Ba, Sr, X=La, Y) System" by K. Kaneko et al., pp. L734–L735.

*Applied Physics Letters*, vol. 50(9), Mar. 2, 1987, "Super Critical Fields and High Superconducting Transition Temperatures of $La_{1.85}Sr_{0.15}CuO_4$ and $La_{1.85}Ba_{0.15}CuO_4$" by D. W. Capone et al., pp. 543–544.

*Japanese Journal of Applied Physics*, vol. 26, No. 5, May 5, 1987, "Preparation of High-$T_c$Y–Ba–Cu–O Superconductor" by T. Kawai et al., pp. L736–L737.

High–Temperature Superconducting Materials, edited by W. E. Hatfield et al., University of North Carolina, "Oxalate Precipitation Methods for Preparing the Yttrium–Barium–Copper Superconducting Compound" by R. J. Clark et al, pp. 153–158.

*Nature*, vol. 329, Oct. 22, 1987, "Synthesis of the High-$T_c$ Superconductor $YBa_2Cu_3O_{7-\delta}$" by A. Manthiram et al, pp. 701–703.

*Inorg. Chem.* 1987, 26, "Comparison of Carbonate, Citrate, and Oxalate Chemical Routes to the High-$T_c$ Metal Oxide Superconductors $La_{2-x}Sr_xCuO_4$" by H. H. Wang et al, pp. 1474–1476.

*Symposium on High Temperature Superconducting Materials, Preparation, Properties, Processing*, Morehead Planetarium, Unc. Chapel Hill, N.C., Sep. 18, 19, p. 918–7.

*Yogyo-Kyokai-Shi* (Japan) (1988) vol. 96, No. 4, "Synthesis of Superconducting Y–Ba–Cu–O Powder by the Spray Drying Method" by M. Awano et al., (abstract).

*Japanese Journal of Applied Physics Suppl.* (Japan) (1987), vol. 26, suppl. 26-3, pt. 2, "The Superconducting Properties for La–Sr–Cu–O Systems" by M. Wakata et al (abstract).

METHOD OF PRODUCING MIXED METAL OXIDE MATERIAL, AND OF PRODUCING A BODY COMPRISING THE MATERIAL

FIELD OF THE INVENTION

This invention pertains to methods of producing mixed metal oxide material, and of making a body that comprises the material. In a particular embodiment the body is a superconductive body.

BACKGROUND OF THE INVENTION

The recent discovery of superconductivity in a (La, Ba) cuprate led to worldwide research activity which quickly resulted in the discovery of other metal oxides having relatively high superconductive transition temperature $T_c$. In particular, it was discovered that $YBa_2Cu_3O_7$ can have $T_c$ of abut 90K. To date, the research efforts have resulted in the identification of several classes of high $T_c$ oxide superconductors.

One class of metal oxide superconductors has nominal composition $Ba_{2-y}(M_{1-x}M'_x)_{1+y}Cu_3O_{9-\delta}$, where M and M' are chosen from Y, Eu, Nd, Sm, Gd, Dy, Ho, Er, Tm, Yb, Lu, La, Sc, Sr or combinations thereof. Typically, $0 \leq x \leq 1, 0 \leq y \leq 1$, and $1 < \delta < 3$. This class will be referred to as the Ba-cuprate system. Many members of the Ba-cuprate system have $T_c$ greater than 77K, the boiling point of liquid nitrogen. Exemplary of the Ba-cuprate system are $YBa_2Cu_3O_7$ (frequently referred to as the "1:2:3" compound), $EuBa_2Cu_3O_7$, and $La_{1.5}Ba_{1.5}Cu_3O_7$. (It will be understood that chemical formulae of oxide superconductors and other mixed metal oxides herein are approximate only, and that deviations may occur. For instance, the optimal oxygen content in $YBa_2Cu_3O_7$ frequency is not 7 but about 6.9.)

Other classes of oxide superconductors are the Tl-Ba-Ca-Cu oxides (exemplified by $Tl_2Ba_2CaCuO_8$, see, for instance, Nature Vol. 332, Mar. 31, 1988, page 420), the Bi-Sr-Ca-Cu oxides (exemplified by $Bi_{2.2}Sr_2Ca_{0.8}Cu_2O_{8+\delta}$; ibid, page 422), and the copper-free bismates (exemplified by $Ba_{.6}K_{.4}BiO_3$; see U.S. patent application Ser. No. 187,098, filed Apr. 28, 1988).

A multitude of applications for the novel high $T_c$ oxide superconductors have been proposed, and many of the proposed applications require the formation of bulk bodies comprising superconductive material. For a general overview of some potential applications of superconductors see, for instance. B. B. Schwartz and S. Foner, editors, *Superconductor Applications: SQUIDS and MACHINES*, Plenum Press 1977; and S. Foner and B. B. Schwartz, editors, *Superconductor Materials Science, Metallurgy, Fabrications, and Applications*, Plenum Press 1981. Among the applications are power transmission lines, rotating machinery, and superconductive magnets for e.g., fusion generators, MHD generators, particle accelerators, levitated vehicles, magnetic separation, and energy storage, as well as junction devices, interconnects, and detectors, It is expected that many of the above and other applications of superconductivity would materially benefit if high $T_c$ superconductive material could be used instead of the previously considered relatively low $T_c$ materials. See also U.S. patent applications Ser. No. 036,160, 126,083, and 022,229, all incorporated herein by reference.

In general, bulk superconducting bodies (including relatively thick films such as are produced by application of a paste to a substrate) are made from a starting material that comprises a powder of the appropriate metal oxide or oxides. Similarly, bulk bodies of non-superconductive metal oxides (e.g., ferrite bodies) can be produced from a starting material that comprises powder of the appropriate oxide or oxides. In all these cases the overall metal composition of the starting material corresponds directly to the desired metal composition of the body to be produced, but the powder can be a mixture of metal oxides. The oxygen content of the powder typically does not correspond to the desired final oxygen content.

Production of high $T_c$ metal oxide powder is frequently accomplished by reaction of the component oxides and/or carbonates, involving typically repeated calcining and comminution steps, which is not only time consuming but may lead to the introduction of contaminants (it is well known that the presence of many common elements leads to poisoning of the superconducting properties such as high $T_c$). However, other approaches, (including co-precipitation) have also been used to produce the metal oxide powder for bulk superconductors. For instance, J. G. Bednorz and K. A. Müller, *Zeitschrift fur Physik B-Condensed Matter*, Vol. 64, pp. 189–193 (1986) report on page 190 the preparation of multiphase (Ba, La) cuprate by means of co-precipitation from an aqueous solution of the nitrates, using oxalic acid as the precipitant, and heating of the oxalate precipitate. See also A. Manthirama et al, *Nature*, Vol. 329, Oct. 22, 1987, page 701.

Chung-Tse Chu et al, *Journal of the American Ceramic Society*, Vol. 70(12), 1987, C-375, report the preparation of high $T_c$ superconducting oxide powder by a citrate process which involves dissolving in water the nitrate slats of the metal constituents of the oxide, adding citric acid to the solution, optionally adding $NH_3OH$ to bring the pH of the solution to about 6, heating the solution to evaporate the water, and firing the resulting residue to form the desired oxide.

X. Z. Wang et al, *Solid State Communication*, Vol. 64(6), 1987, page 881 report on the formations of high $T_c$ oxide powder ($YBa_2Cu_3O_x$) by a process that comprises dissolving copper acetate and yttrium nitrate in water, dissolving barium hydroxide in acetic acid, and pouring the resulting solution into an aqueous solution of oxalic acid. The resulting precipitate is then fired to produce the oxide.

Oxalic acid co-precipitation of aqueous metal nitrate solutions is also reported by A. Koyanagi et al, *Seissan Kenkyu* (Japan), Vol. 39(11), 1987, page 8, M. Hirabayashi et al, *Japanese Journal of Applied Physics*, Vol. 26(4), 1987, page L454, K. Kaneko et al, ibid, Vol. 26(5), 1987, page L734, D. W. Capone et al, *Applied Physics Letters*, Vol. 50(9), 1987, page 543, and by T. Kawai et al, *Japanese Journal of Applied Physics*, Vol. 26(5), 1987, page 736.

R. J. Clark et al, *High-Temperature Superconducting Materials*, edited by W. E. Hatfield et al, University of North Carolina, pp. 153–158) report, inter alia, treating "1:2:3" solutions of the nitrates with about 75% excess of oxalic acid to precipitate the bulk of the metals, evaporating the suspension to dryness, and heat treating the resulting solid. The procedure is reported to result in an exothermic reaction between nitrate and oxalate. The authors caution that this heat treatment should be done with care using limited quantities of material.

The prior art methods of forming mixed metal oxide power material typically are time consuming and generally not easily adapted to continuous processing and/or scaling up to industrial scale. Furthermore, prior art co-precipitation methods typically depend on control of a variety of parameters such a pH and solubility product.

In view of the potential importance of bulk high $T_c$ metal oxide superconductors and other articles that comprise mixed metal oxide powder, it would be highly desirable to have available a simple, fast, inexpensive, easily controllable, and efficient method for producing mixed metal oxide powder that is suitable for scale-up to industrial quantities. Desirably such a method also would be able to produce essentially single phase material that is essentially free of contaminants and has relatively uniform and relatively small particle size. Furthermore, such a method desirably would have broad applicability and permit the production of a wide range of compositions, including for high $T_c$ superconductive oxides. This application discloses such a method.

Definitions

A "metal" herein is an element that forms positive ions when its compounds are in solution, and whose oxides form hydroxides rather than acids with water.

By "salt" we mean herein a compound which dissolves in water and is composed of one or more anions and one or more cations.

A "mixed metal oxide" herein is a compound of oxygen and two or more metals, an intimate mixture of the oxides of two or more metals, or a combination of the above.

All terms not explicitly defined herein have their customary meaning as defined in "The Condensed Chemical Dictionary", 10th edition, revised by G. G. Hawley.

Summary of the Invention

Disclosed is a novel method for producing an article, (e.g., a superconductive magnet or a microwave component) that comprises a body that comprises a mixed metal oxide. Exemplarily the body is a superconductive wire or tape, or is a ferrite bead.

The mixed oxide has nominal composition $M_xM'_y \ldots O_z$, where M, M' ... are metal elements (exemplarily chosen from the alakalis, alkaline, earths, the transition metals of atomic number 21-30, 39-48, 57-80, the column III elements Al, Ga, In, and Tl, and the column IV elements Sn and Pb), and x, y, ... z can have any appropriate (not necessarily integer) non-negative value, with at least x, y, and z being non-zero.

The method comprises forming a mixture of salts that comprises at least one salt of each of M, M' ..... At least one of the salts is an oxidizing agent with respect to at least one of the other salts, such that an oxidation-reduction reaction (in which the reactive anion species are essentially completely consumed to give gaseous decomposition products, leaving essentially no residue as an impurity) can occur in the mixture at an appropriate reaction temperature. This oxidation-reduction (redox) reaction will also be referred to as a "self-propagating chemical decomposition" (SCD). It will be appreciated that the metal ions are present in the mixture in proportions such that the final oxide has the desired composition. Typically, this means that the metals M, M', ... are present in atomic ratio x:y: ....

In exemplary embodiments, one or more metal nitrates serve as the oxidizing agent, and one or more metal formates, acetates, propionates, and/or other appropriate metal-organic salts serve as the reducing agent. The ratio of oxidizing agent (or agents) to reducing agent (or agents) is chosen such that the oxidation-reduction reaction proceeds at a desired rate at a desired reaction temperature. It is to be noted that the results generally do not depend on which metal is associated with the oxidizing agent or with the reducing agent. Instead, the results generally depend, for a given oxidizing agent and reducing agent, only on the ratio of oxidizing agent to reducing agent.

The method typically comprises forming a (non-explosive) aqueous solution of the salts, drying the solution (resulting in formation of a residue that comprises a mixture of the salts), and heating the residue to the reaction temperature such that the SCD occurs, with the metal oxide or, more typically, a precursor material of the mixed metal oxide being formed. If precursor material was formed then the method further comprises heating the precursor material in an oxygen-containing atmosphere such the desired mixed metal oxide powder is formed from the precursor material. In exemplary preferred embodiments the reaction temperature is a temperature less than about 300° C.

The typical product of the SCD, the precursor material of the desired mixed metal oxide, typically is a mixture of oxides of M, M' . . . that can be essentially free of contaminants. Significantly, the reaction can be carried out at a relatively low temperature, due to its exothermic character. For instance, we have formed the precursor material for $YBa_2Cu_3O_z(z \sim 7)$ from a mixture of nitrates and acetates at 270° C., which is significantly lower than the decomposition temperature of the acetate or nitrate salts alone.

The precursor material typically is heated in an oxygen-containing atmosphere such that the desired mixed metal oxide results. For instance, maintaining the above referred to precursor material at 910° C. for 5-10 minutes in air resulted in essentially single phase (>90%, frequently >95%) $YBa_2Cu_3O_z$. Bodies made from this material by a conventional technique were superconductive, with $T_c(R=0)$ of about 91K.

The mixed oxide powder produced according to the invention can be used in the same way as such powders produced by prior art methods are used. For instance, they can in a conventional manner be formed into a desired body, and the body can be incorporated into an appropriate article, also in conventional manner. Exemplarily, if the mixed oxide is an appropriate ferrite then the body can be a ferrite bead or other ferrite body, and the article can be a microwave device or apparatus; if the oxide powder is high $T_c$ superconductive powder then the body can be magnetic tape or wire and the article can be a superconductive magnet.

DETAILED DESCRIPTION OF SOME EXEMPLARY EMBODIMENTS

Figure 1:
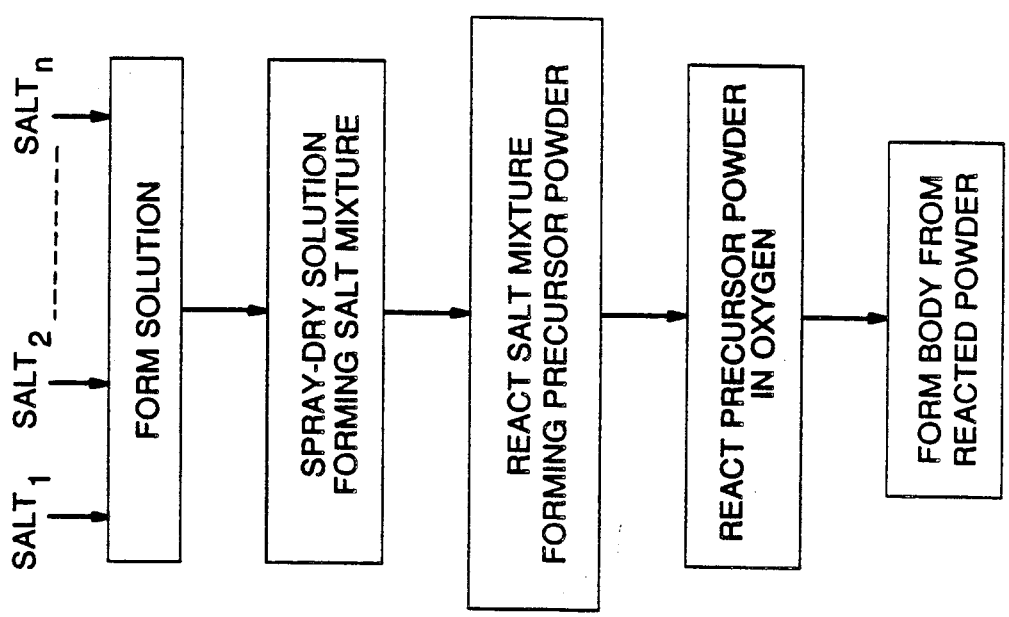
FIG. 1 shows, in form of a flow chart, major steps in a preferred embodiment of the invention.

In many currently preferred exemplary embodiments the oxidizing agent is a nitrate or nitrates and the reducing agent is one or more acetates, formates, and/or propionates. Although the invention is not so limited, the discussion below will be primarily in terms of these particular salts. Some major steps in an exemplary preferred embodiment of the inventive process are indicated in FIG. 1.

Figure 2:
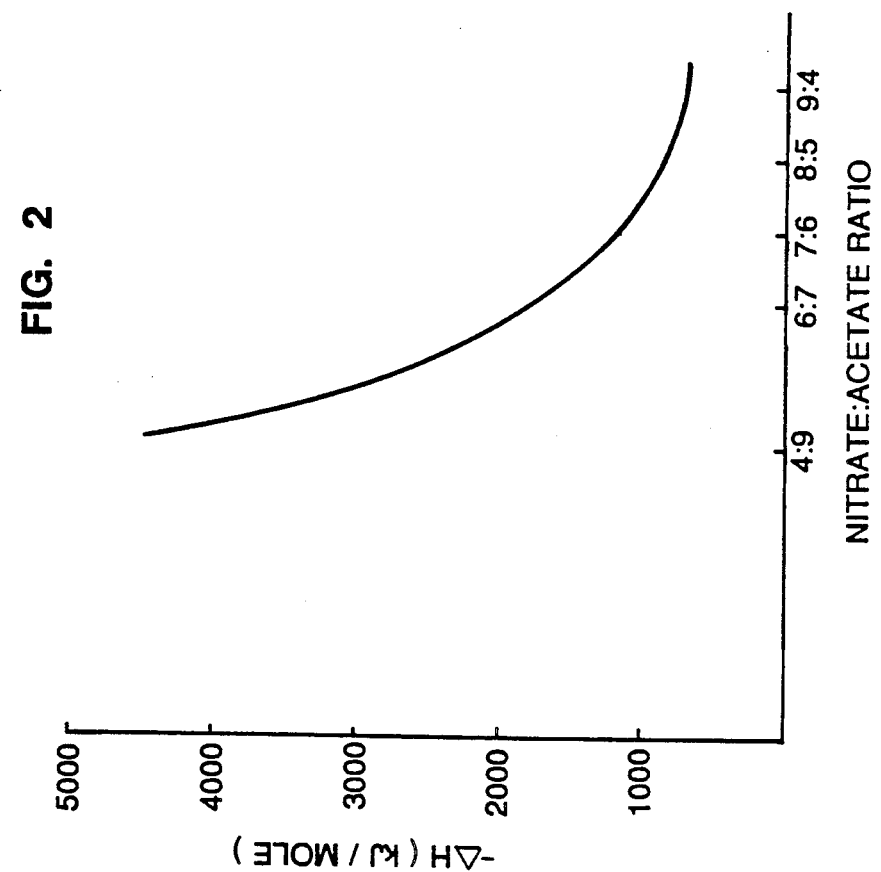
FIG. 2 illustrates the dependence of the heat of reaction on the acetate:nitrate ratio of exemplary salt mixtures that are useful in the practice of the invention.

A significant aspect of the invention is the ability to, at least to some extent, control the heat of reaction and the reaction temperature of the SCD by simple means, namely, appropriate choice of oxidizing and reducing agents, and of the molar ratio of oxidizing to reducing agents. This is illustrated by FIG. 2, which shows the heat of reaction $-\Delta H$ as a function of the nitrate/acetate ratio in the mixture of salts. As can be seen, the reaction is exothermic for a significant range of the ratio, with the heat of reaction strongly dependent on the ratio of oxidizing agents to reducing agent.

As those skilled in the art will recognize, choice of $\Delta H$ through, inter alia, the oxidizing agent/reducing agent ratio offers the possibility of control of the rate of reaction, such that the SCD can be chosen to proceed substantially at any desired rate. Although typically this rate will be non-explosive, under appropriate conditions (e.g., small quantities, confined space) even an explosive reaction may be useful, since it can be expected to result in especially well mixed small grained powder.

Other organic salts (e.g., formates or propionates) yield $\Delta H$-curves that are of similar shape to that obtained for acetate but differ in some details therefrom. In particular, we have found that the maximum value of $\Delta H$ for a given cation is greater if propionates are used instead of acetates, and is smaller if formates are used instead of acetates. This offers further means of controlling the redox reaction, namely, forming a mixture containing more than one type of reducing agent.

Choice of the organic salts also affects the reaction temperature. For instance, for a particular $NO_3$/organic salt ratio the reaction temperatures were 240° C., 270° C., and greater than 270° C. if the organic salts were formates, acetates, or propionates, respectively (the metal ratios were Y:2Ba:3Cu). Thus, appropriate choice of oxidizing agent/reducing agent ratio, together with appropriate choice of reducing agent (typically an organic salt) makes possible control of the reaction rate and, at least to some extent, of the reaction temperature.

In currently preferred embodiments of the invention the metal salts are dissolved in water and the solution is spray dried by conventional means, resulting in an intimate mixture of metal salts. The quantities to be dissolved are selected such that the solution contains the metal ions in the same ratio as is desired to be present in the mixed metal oxide. For instance, in order to produce "1:2:3" material ($YBa_2Cu_3O_z$), x moles of yttrium nitrate; 2 x moles of barium formate, and 3 x moles of copper nitrate are dissolved. Although nitrates are the currently preferred oxidizers the invention is not so limited, and other oxidizers (e.g., chlorates) are also contemplated.

After formulation of the intimate mixture of metal salts (e.g., by spray drying of the solution) the mixture is heated to the reaction temperature, whereby the reaction is initiated. Heating can be, but need not be, in air. Due to its exothermic nature, the reaction typically readily goes to completion, with the mixture of salts being transformed into a mixed metal oxide which, typically, comprises an intimate mixture of metal oxides. The salts are advantageously chosen such that their anionic portions readily decompose at the reaction temperature, with the products of the decompositions being volatile at that temperature. Such a choice of salts can result in a mixed metal oxide that is substantially free of impurities. This is considered to be a significant advantage of the inventive method.

Subsequent to completion of the SCD the resulting material is typically subjected to a heat treatment in an oxygen-containing atmosphere such that the desired mixed oxide results. For instance, the production of superconductive ($T_c \sim 91K$) "1:2:3" powder exemplarily comprised heating of oxidic precursor material to 910° C. for 5–10 minutes. In a variant of this procedure the salt mixture is heated in $O_2$ to about 900° C., with the reaction occurring at an intermediate temperature, and formation of the 1:2:3 powder occurring at the final temperature.

EXAMPLE 1

Figure 3:
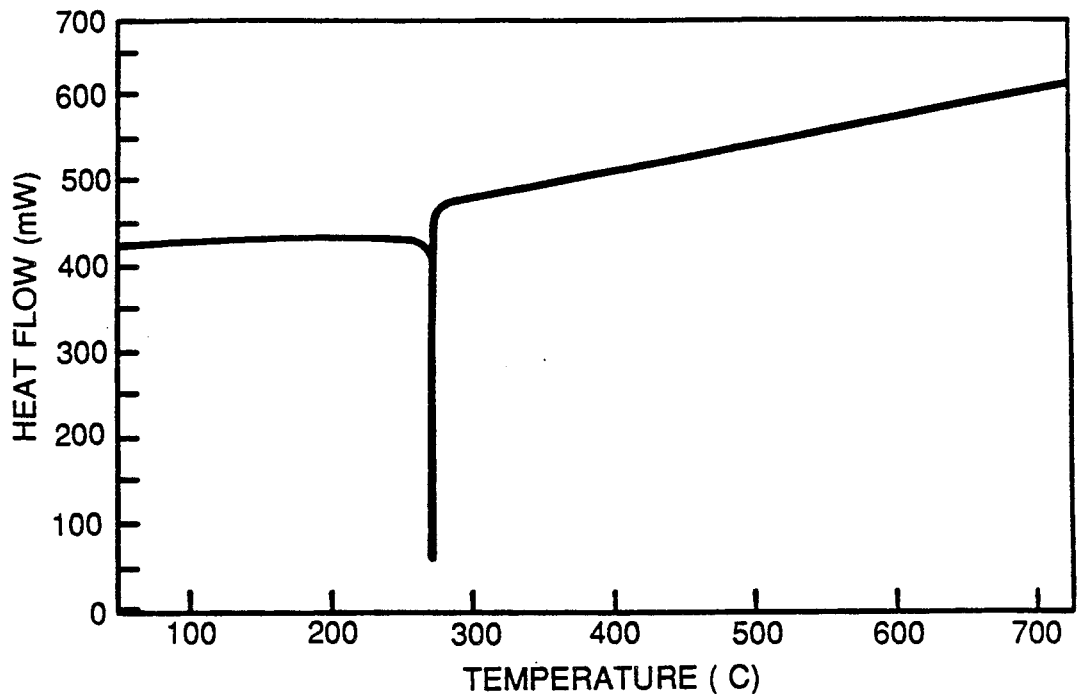
FIGS. 3 and 4 give differential scanning calorimetry results for a salt mixture according to the invention, and for a mixture of metal acetates, respectively.

From commercially obtained quantities of hydrated $Ba(CH_3COO)_2$, $Ba(NO_3)_2$, $Y(CH_3COO)_3$, $Y(NO)_3$, $Cu(CH_3COO)_2$ and $Cu(NO_3)_2$, 191.57 g. of barium acetate, 84.09 g of yttrium acetate, 44.64 g of yttrium nitrate, and 269.91 g of copper nitrate, were taken and dissolved in water, resulting in a solution that contained Y, Ba, and Cu in the ratio 1:2:3, and that contained acetate and nitrate in the ratio 6:7. Enough solution to make 250 g of "1:2:3" powder was spray dried using a commercially available conical type laboratory spray drier, resulting in formation of a light blue powder that was an intimate mixture of acetates and nitrates of Y, Ba, and Cu. A sample of the powder was analyzed by differential scanning calorimetry (DSC) in flowing $O_2$, with the result of the analysis shown in FIG. 3. As can be seen from the FIGURE, a strongly exothermic reaction ($-\Delta H > 1162$ kJ/mole) occurred at about 270° C. The remainder of the salt mixture was put into ceramic boats and placed under flowing $O_2$ into a furnace that was kept at about 400° C. The SCD reaction occurred as anticipated and yielded a mixed oxide powder. The powder was then heated to 900° C. and maintained at that temperature for 10 minutes under flowing $O_2$, followed by a slow cool to room temperature, also under flowing $O_2$. The resulting powder was analyzed by powder X-ray diffraction, with the result indicating that the powder was single phase $YBa_2Cu_3O_x$ to within the limits of X-ray detection. Similar X-ray analysis of the DSC sample had shown that the reaction had gone to completion. Specifically, no $Ba(NO_3)_2$ was detected. From the thus produced 1:2:3 powder pellets were formed by cold pressing. The pellets were superconducting, with $T_c(R=0)$ of abut 91K. Sintered disks were also formed by a conventional method. The disks were also superconducting, with $T_c (R=0)$ of about 91K.

EXAMPLE 2

Sintered superconducting disks were prepared substantially as in Example 1, except that the salt mixture was placed, under flowing $O_2$, into a furnace at 900° C. and maintained at that temperature for 10 minutes. The SCD reaction occurred at an intermediate temperature.

In the examples below the salt solution was prepared to contain the metals in the indicated ratios and the indicated reducing agent/oxidizing agent ratio. The preparation procedures were standard and do not require recitation.

EXAMPLES 3–6

1:2:3 powders were prepared substantially as described in Example 1, except that the aqueous salt solutions had acetate:nitrate ratios of 9:4, 7:5, 5:8, and 4:9, respectively. The exothermic SCD reactions had ΔH of −4016, −2406, −890, and −721 kJ/mole, respectively, with the main exotherms of the former two occurring at 326 and 296° C., and the latter two having a single sharp exotherm at about 270° C. The powder resulting from the 5:8 (acetate:nitrate) mixture comprised, in addition to $YBa_2Cu_3O_x$, about 2% $BaCuO_2$, and 4:9 (acetate:nitrate) powder comprised, in addition to the $YBa_2Cu_3O_x$, about 2% $BaCuO_2$ and less than 1% of $BaCO_3$. Sintered pellets were prepared from these powders by a standard technique. The pellets were essentially single phase (>95%) and superconducting, with $T_c(R=0) \geq 88K$.

EXAMPLE 7

Figure 4:
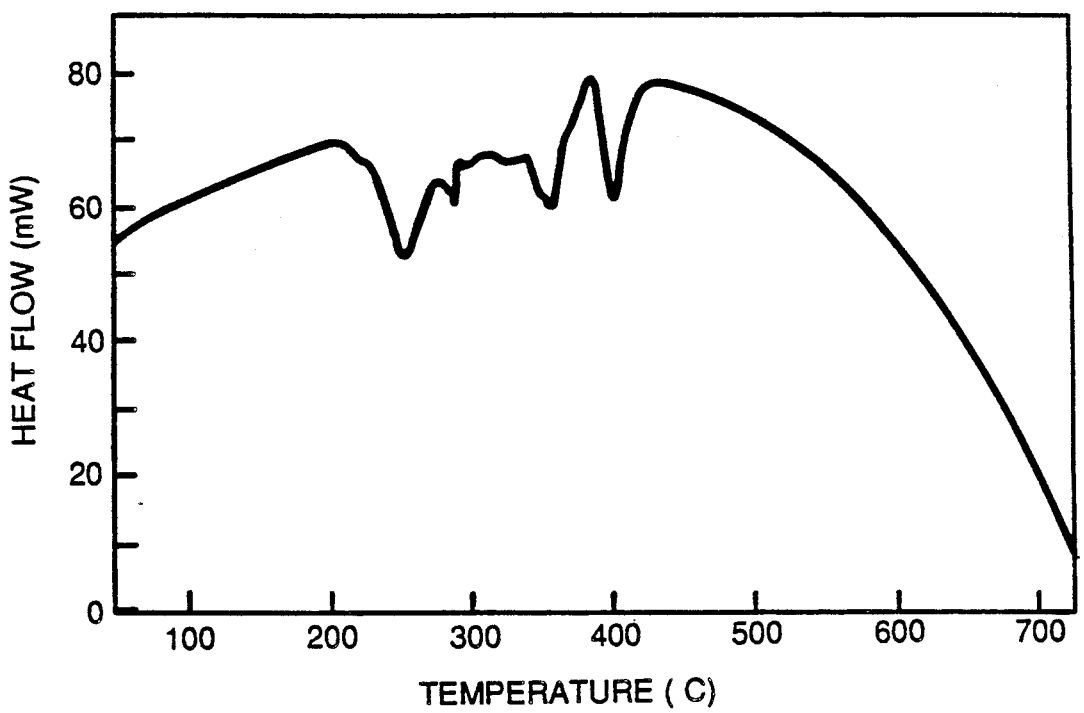

An intimate mixture of Y, Ba, and Cu salts were prepared substantially as described in Example 1, except that the mixture did not contain any nitrates. The mixture was analyzed by DSC, with the result shown in FIG. 4. As the figure shows, the decomposition is a multi-step process that is not complete until about 400° C. This is in agreement with previous reports on spray-dried acetate salt.

EXAMPLES 8-10

1:2:3 powders were prepared substantially as described in Example 1, except that formates ($Ba(HCOO)_2$, $Y(HCOO)_3$, and $Cu(HCOO)_2$) were used instead of the acetates. Solutions having a formate:nitrate ratio of 9:4, 8:5, and 6:7 were prepared. DSC analysis determined that the SCD reaction occurred over the ranges 163–284, 167–272, and 173° C.–276° C., respectively, with the peaks occurring at 210, 221, and 253° C., respectively, with −ΔH of 804, 770, and 473 kJ/mole, respectively. Pellets made from the thus produced 1:2:3 powders were essentially single phase superconducting $YBa_2Cu_3O_x$, with $T_c(R=0) \geq 88K$.

EXAMPLES 11-12

1:2:3 powders were prepared substantially as described in Example 1, except that propionates ($Ba(H_3C-CH_2-COO)_2$, etc.) were used instead of the acetates. Solutions having a propionates:nitrate ratio of 4:9 and 7:6 were prepared. DSC analysis determined the peak of the SCD reaction to occur at 264 and 289° C., respectively, with −ΔH of 1073 and 2058 kJ/mole, respectively. Pellets made from the thus produced 1:2:3 powders are essentially single phase superconducting $YBa_2Cu_3O_x$, with $T_c(R=0) \geq 88K$.

EXAMPLES 13-15

1:2:3 powders were prepared substantially as described in Example 1, except that respective glycine salts ($Ba(H_2N-CH_2-COO)_2$, etc.), β-alanine salts ($Ba(H_2N-CH_2-CH_2-COO)_2$), etc.) and α-alanine salts ($Ba(CH_3-CH_2NH_2-COO)_2$, etc.) were substituted for the acetate salts. In all three cases the solutions had a 4:9 amino acid:nitrate ratio. DSC analysis determined that the SCD reactions occurred over the range 201–216, 186–195, and 201° C.–216° C., respectively, with peak temperatures of 206, 191, and 206° C., respectively. Pellets made from the thus produced 1:2:3 powders are essentially single phase superconducting $YBa_2Cu_3O_x$, with $T_c(R=0) \geq 88K$.

EXAMPLE 16

A spinel powder ($NiMn_2O_4$) was produced by a method substantially as described in Example 1, except that $Ni(NO_3)_2$ and $Mn(CH_3COO)_2$ were dissolved in water, with the Ni:Mn ratio being 1:2. The intimate salt mixture was heated on a hot plate, and an exothermic reaction occurred. The resulting precursor material was ground an fired in a Pt boat at 920° C. for 6 hours under $O_2$. The resulting mixed oxide powder was essentially single phase $NiMn_2O_4$, as determined by X-ray diffraction.

EXAMPLE 17

A ferrite powder ($MnFe_2O_4$) is produced substantially as described in Example 1, except that $Mn(NO_3)_2$ and $Fe(CH_3-COO)_2$ were dissolved in water, with the Mn:Fe ratio being 1:2. The salt mixture is reacted in a furnace under $O_2$, and the resulting precursor material is heated to 920° C. and fired under $O_2$ for 6 hours. The resulting powder is essentially single phase. A bead is formed from the powder by a conventional technique.

EXAMPLE 18

A superconducting oxide powder ($Tl_2Ba_2Ca_2Cu_3O_{10}$) is produced substantially as described in Example 1, except that two molar units each of $Tl(NO_3)$, $Ba(CH_3-COO)_2$, and $Ca(CH_3-COO)_2$, and three molar units of $Cu(NO_3)_2$ are dissolved in water.

EXAMPLE 19

1:2:3 powder is produced substantially as described in Example 1, except that one half molar unit each of $Ba(NO_3)_2$ and $Ba(ClO_4)_2$, one molar unit each of $Y(CH_3-COO)_3$ and $Ba(CH_3-COO)_2$, and 3 molar units of $Cu(NO_3)_2$ are dissolved in water. The SCD reaction is relatively vigorous.

What is claimed is:

1. A method of producing an article that comprises a body comprising a mixed metal oxide of nominal composition $M_xM'_y \ldots O_z$ wherein M, M' ... are metal elements and at least each of x, y and z is greater than zero, the method comprising
   (a) forming an intimate mixture comprising at least one salt each of M, M' ... such that the mixture contains M, M' ... in essentially the ratio x:y: ... ; with the salts chosen such that at least one of the salts is an oxidizing agent with respect to at least one of the other salts (to be referred to as the reducing agent);
   (b) heating the mixture at least to a reaction temperature less than about 300° C. such that an exothermic oxidation-reduction occurs and a precursor material of the mixed metal oxide is formed from the mixture, the precursor material consisting essentially of M, M' ... and, optionally of oxygen;
   (c) heating the precursor material in an oxygen-containing atmosphere such that the mixed metal oxide is formed from the precursor material; and
   (d) carrying out one or more further steps towards completing the article.

2. Method of claim 1, where (a) comprises dissolving the at least one salt each of M, M' ... in an aqueous medium, and drying the solution, whereby the intimate mixture is formed, and wherein the oxidizing agent or agents and reducing agent or agents, as well as a the ratio of the former to the latter, are chosen such that the exothermic reaction occurs at a desired rate and at a desired temperature.

3. Method of claim 1, wherein the mixed metal oxide is superconducting at a temperature above about 30K, or is a ferrite.

4. Method of claim 1, wherein the body is a superconducting body or a ferrite body.

5. Method of claim 2, wherein the at least one oxidizing agent is a nitrate.

6. Method of claim 2, wherein the at least one reducing agent is selected from the group consisting of the acetates, formates, propionates, glycines, and alanines.

7. Method of claim 3, wherein the mixed metal oxide has nominal composition $YBa_2Cu_3O_x$, with $x \sim 7$.

8. Method of claim 3, wherein (d) comprises sintering the body in an oxygen-containing atmosphere.

9. Method of claim 4, wherein the body is a superconducting body adapted for carrying an electric current.

* * * * *